United States Patent
Skalicky et al.

(10) Patent No.: US 10,386,491 B2
(45) Date of Patent: Aug. 20, 2019

(54) EFFICIENT COVARIANCE MATRIX UPDATE

(71) Applicant: Honeywell International Inc., Morris Plains, NJ (US)

(72) Inventors: Jakub Skalicky, Brno (CZ); Martin Orejas, Brno (CZ); Jussi Raasakka, Brno (CZ); Ondrej Kutik, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 769 days.

(21) Appl. No.: 14/949,272

(22) Filed: Nov. 23, 2015

(65) Prior Publication Data
US 2017/0146663 A1 May 25, 2017

(51) Int. Cl.
*G01S 19/20* (2010.01)

(52) U.S. Cl.
CPC .................. *G01S 19/20* (2013.01)

(58) Field of Classification Search
CPC ....................................................... G01S 19/20
See application file for complete search history.

(56) References Cited

U.S. PATENT DOCUMENTS

| 6,205,377 | B1 * | 3/2001 | Lupash .............. G01S 19/20 342/357.58 |
| 6,864,836 | B1 | 3/2005 | Hatch et al. |
| 8,676,736 | B2 | 3/2014 | Pilaszy et al. |
| 2001/0002455 | A1 * | 5/2001 | Uekawa ............... G01C 21/26 701/520 |
| 2015/0011196 | A1 * | 1/2015 | Jayakumar ........... H04W 4/029 455/418 |

FOREIGN PATENT DOCUMENTS

| CN | 104035069 | 9/2014 |
| EP | 0575033 | 12/1993 |

(Continued)

OTHER PUBLICATIONS

A.J. Van Dierendonck, GPS Receivers, in Parkinson et al. (ed.), Global Positioning System: Theory and Applications, vol. 1; Progress in Astronautics and Aeronautics, vol. 163, American Institute of Aeronautics and Astronautics, Inc., p. 329-407, 1996 (Year: 1996).*

(Continued)

*Primary Examiner* — Bernarr E Gregory
*Assistant Examiner* — Fred H Mull
(74) *Attorney, Agent, or Firm* — Fogg & Powers LLC

(57) ABSTRACT

An efficient covariance matrix computation method is disclosed in connection with certain GNSS applications, including Advanced Receiver Autonomous Integrity Monitoring (ARAIM) and geometry screening. The system and method of the present application enable computation of multiple covariance matrices with substantially greater efficiency than previous approaches, including the rank-one update formula. For example, the system and method of the present application advantageously involves substantially fewer and simpler arithmetic operations than previous approaches. In addition, unlike the rank-one update formula, the system and method of the present application can be used to compute the subsolution in which all the satellites of a given constellation are removed.

18 Claims, 9 Drawing Sheets

(56) References Cited

FOREIGN PATENT DOCUMENTS

| EP | 2068165 | 6/2009 |
|---|---|---|
| WO | 2010022675 | 3/2010 |

OTHER PUBLICATIONS

Driver. (2001). Hargrave's Communications Dictionary. Hoboken, NJ: Wiley. Retrieved from https://search.credoreference.com/content/entry/hargravecomms/driver/0 (Year: 2001).*

Hardware abstraction layer (HAL). (2001). Hargrave's Communications Dictionary. Hoboken, NJ: Wiley. Retrieved from https://search.credoreference.com/content/entry/hargravecomms/hardware_abstraction_layer_hal/0 (Year: 2001).*

E.W. Weisstein, Symmetric Matrix, MathWorld—A Wolfram Web Resource, http://mathworld.wolfram.com/SymmetricMatrix.html, Sep. 11, 2015 (Year: 2015).*

Connection. (2016). The American Heritage Dictionary of the English Language (6th ed.). Boston, MA: Houghton Mifflin. Retrieved from https://search.credoreference.com/content/entry/hmdictenglang/connection/0 (Year: 2016).*

The Hutchinson Unabridged Encyclopedia with Atlas and Weather Guide, What is the basic structure of a computer system?, https://search.credoreference.com/content/entry/heliconhe/what_is_the_basic_structure_of_a_computer_system_what_are_the_three_main_elements_of_the_central_processing_unit/0 (Year: 2018).*

European Patent Office, "Extended European Search Report from EP Application No. 16197444.9 dated May 8, 2017", "from Foreign Counterpart of U.S. Appl. No. 14/949,272", dated May 8, 2017, pp. 1-8, Published in: EP.

Blanch et al., "Baseline Advanced RAIM User Algorithm and Possible Improvements", Jan. 2015, pp. 713-732, vol. 51, No. 1, Publisher: IEEE Transactions on Aerospace and Electronic Systems.

Chan, "A Practical Approach to RAIM-based Fault-Tolerant Position Estimation", "The Institute of Navigation", Sep. 21-24, 2010, pp. 3181-3190, Publisher: Proceedings of the 23rd International Technical Meeting of the Satellite Division of The Institute of Navigation, Published in: Portland, OR.

Li et al., "Efficient Estimation of Variance and Covariance Components: A Case Study for GPS Stochastic Model Evaluation", "IEEE Transactions on Geoscience and Remote Sensing", Jan. 1, 2011, pp. 203-210, vol. 49, No. 1, Publisher: IEEE, Published in: US.

Tu et al., "Evaluation of GNSS Receiver Autonomous Integrity Monitoring for Multiple Outliers With a Smart Random Sample Consensus Strategy", "Geoinformatics 2011, 19th International Conference", Jun. 24-26, 2011, pp. 1-6, Publisher: IEEE, Published in: US.

* cited by examiner $$G = \begin{pmatrix} g_{11} & g_{12} & \cdots & g_{1n} \\ g_{21} & g_{22} & \cdots & g_{2n} \\ \vdots & \vdots & \ddots & \vdots \\ g_{m1} & g_{m2} & \cdots & g_{mn} \end{pmatrix}$$

FIG. 2A $$W = \begin{pmatrix} w_{11} & 0 & \cdots & 0 \\ 0 & w_{22} & \cdots & 0 \\ \vdots & \vdots & \ddots & \vdots \\ 0 & 0 & \cdots & w_{mm} \end{pmatrix}$$

FIG. 2B $$A = \begin{pmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{pmatrix}$$

FIG. 2C $$G_{\hat{i}} = \begin{pmatrix} g'_{11} & g'_{12} & \cdots & g'_{1n} \\ g'_{21} & g'_{22} & \cdots & g'_{2n} \\ \vdots & \vdots & \ddots & \vdots \\ g'_{m1} & g'_{m2} & \cdots & g'_{mn} \end{pmatrix}$$

FIG. 2D $$A_{\hat{i}} = \begin{pmatrix} a'_{11} & a'_{12} & \cdots & a'_{1n} \\ a'_{12} & a'_{22} & \cdots & a'_{2n} \\ \vdots & \vdots & \ddots & \vdots \\ a'_{1n} & a'_{2n} & \cdots & a'_{nn} \end{pmatrix}$$

$$A_{\hat{i}} \text{ (abridged)} = \begin{pmatrix} a'_{11} & a'_{12} & \cdots & a'_{1n} \\ - & a'_{22} & \cdots & a'_{2n} \\ \vdots & \vdots & \ddots & \vdots \\ - & - & \cdots & a'_{nn} \end{pmatrix}$$

FIG. 4

$$G = \begin{pmatrix} -0.09394 & -0.69841 & 0.70951 & 1 & 0 \\ -0.77519 & 0.49721 & 0.3897 & 1 & 0 \\ 0.16274 & -0.97197 & 0.16966 & 1 & 0 \\ -0.78944 & -0.065148 & 0.61036 & 1 & 0 \\ 0.036755 & 0.70231 & 0.71092 & 1 & 0 \\ 0.79064 & -0.3823 & 0.47827 & 1 & 0 \\ 0.80097 & 0.11428 & 0.5877 & 1 & 0 \\ -0.78091 & -0.46526 & 0.41679 & 0 & 1 \\ -0.58298 & 0.33659 & 0.73949 & 0 & 1 \\ 0.012476 & 0.90892 & 0.41679 & 0 & 1 \\ 0.19722 & 0.78605 & 0.58586 & 0 & 1 \\ 0.71267 & 0.054807 & 0.69936 & 0 & 1 \\ 0.72464 & -0.65493 & 0.2144 & 0 & 1 \\ 0.9295 & -0.30009 & 0.2144 & 0 & 1 \\ 0.30887 & -0.64459 & 0.69936 & 0 & 1 \\ -0.58213 & -0.56382 & 0.58586 & 0 & 1 \end{pmatrix}$$

FIG. 5A $$W = \begin{pmatrix} 0.042 & 0 & 0 & 0 & 0 & 0 & 0 & 0 & 0 & 0 & 0 & 0 & 0 & 0 & 0 & 0 \\ 0 & 0.0154 & 0 & 0 & 0 & 0 & 0 & 0 & 0 & 0 & 0 & 0 & 0 & 0 & 0 & 0 \\ 0 & 0 & 2.22 & 0 & 0 & 0 & 0 & 0 & 0 & 0 & 0 & 0 & 0 & 0 & 0 & 0 \\ 0 & 0 & 0 & 1.99 & 0 & 0 & 0 & 0 & 0 & 0 & 0 & 0 & 0 & 0 & 0 & 0 \\ 0 & 0 & 0 & 0 & 2.01 & 0 & 0 & 0 & 0 & 0 & 0 & 0 & 0 & 0 & 0 & 0 \\ 0 & 0 & 0 & 0 & 0 & 0.451 & 0 & 0 & 0 & 0 & 0 & 0 & 0 & 0 & 0 & 0 \\ 0 & 0 & 0 & 0 & 0 & 0 & 1.46 & 0 & 0 & 0 & 0 & 0 & 0 & 0 & 0 & 0 \\ 0 & 0 & 0 & 0 & 0 & 0 & 0 & 0.514 & 0 & 0 & 0 & 0 & 0 & 0 & 0 & 0 \\ 0 & 0 & 0 & 0 & 0 & 0 & 0 & 0 & 2.66 & 0 & 0 & 0 & 0 & 0 & 0 & 0 \\ 0 & 0 & 0 & 0 & 0 & 0 & 0 & 0 & 0 & 0.239 & 0 & 0 & 0 & 0 & 0 & 0 \\ 0 & 0 & 0 & 0 & 0 & 0 & 0 & 0 & 0 & 0 & 1.07 & 0 & 0 & 0 & 0 & 0 \\ 0 & 0 & 0 & 0 & 0 & 0 & 0 & 0 & 0 & 0 & 0 & 0.528 & 0 & 0 & 0 & 0 \\ 0 & 0 & 0 & 0 & 0 & 0 & 0 & 0 & 0 & 0 & 0 & 0 & 0.0921 & 0 & 0 & 0 \\ 0 & 0 & 0 & 0 & 0 & 0 & 0 & 0 & 0 & 0 & 0 & 0 & 0 & 0.0864 & 0 & 0 \\ 0 & 0 & 0 & 0 & 0 & 0 & 0 & 0 & 0 & 0 & 0 & 0 & 0 & 0 & 0.62 & 0 \\ 0 & 0 & 0 & 0 & 0 & 0 & 0 & 0 & 0 & 0 & 0 & 0 & 0 & 0 & 0 & 0.789 \end{pmatrix}$$

FIG. 5B

$$A = \begin{pmatrix} 0.2587 & -0.0634 & 0.2922 & -0.1663 & -0.1206 \\ -0.0634 & 0.4530 & -1.0851 & 0.6001 & 0.6224 \\ 0.2922 & -1.0851 & 4.7848 & -2.5460 & -2.8542 \\ -0.1663 & 0.6001 & -2.5460 & 1.4800 & 1.5135 \\ -0.1206 & 0.6224 & -2.8542 & 1.5135 & 1.8693 \end{pmatrix}$$

FIG. 5C

$$G_3 = \begin{pmatrix} -0.09394 & -0.69841 & 0.70951 & 1 & 0 \\ -0.77519 & 0.49721 & 0.3897 & 1 & 0 \\ 0 & 0 & 0 & 0 & 0 \\ -0.78944 & -0.065148 & 0.61036 & 1 & 0 \\ 0.036755 & 0.70231 & 0.71092 & 1 & 0 \\ 0.79064 & -0.3823 & 0.47827 & 1 & 0 \\ 0.80097 & 0.11428 & 0.5877 & 1 & 0 \\ -0.78091 & -0.46526 & 0.41679 & 0 & 1 \\ -0.58298 & 0.33659 & 0.73949 & 0 & 1 \\ 0.012476 & 0.90892 & 0.41679 & 0 & 1 \\ 0.19722 & 0.78605 & 0.58586 & 0 & 1 \\ 0.71267 & 0.054807 & 0.69936 & 0 & 1 \\ 0.72464 & -0.65493 & 0.2144 & 0 & 1 \\ 0.9295 & -0.30009 & 0.2144 & 0 & 1 \\ 0.30887 & -0.64459 & 0.69936 & 0 & 1 \\ -0.58213 & -0.56382 & 0.58586 & 0 & 1 \end{pmatrix}$$

FIG. 5D $$g_3 = \begin{pmatrix} 0.1627 \\ -0.9720 \\ 0.1697 \\ 1 \\ 0 \end{pmatrix}$$

FIG. 5E $$\mathbf{v}_3 = A \cdot \mathbf{g}_3 = \begin{pmatrix} 0.2587 & -0.0634 & 0.2922 & -0.1663 & -0.1206 \\ -0.0634 & 0.4530 & -1.0851 & 0.6001 & 0.6224 \\ 0.2922 & -1.0851 & 4.7848 & -2.5460 & -2.8542 \\ -0.1663 & 0.6001 & -2.5460 & 1.4800 & 1.5135 \\ -0.1206 & 0.6224 & -2.8542 & 1.5135 & 1.8693 \end{pmatrix} \cdot \begin{pmatrix} 0.1627 \\ -0.9720 \\ 0.1697 \\ 1 \\ 0 \end{pmatrix} = \begin{pmatrix} -0.0129 \\ -0.0346 \\ -0.6320 \\ 0.4377 \\ 0.4047 \end{pmatrix}$$

FIG. 5F $$x_3 = 1 - w_{33}(\mathbf{g}_3^T \mathbf{v}_3) = 1 - 2.2192 \cdot \left( (0.1627 \ -0.9720 \ 0.1697 \ 1 \ 0) \cdot \begin{pmatrix} -0.0129 \\ -0.0346 \\ -0.6320 \\ 0.4377 \\ 0.4047 \end{pmatrix} \right) = 0.1966$$

FIG. 5G $$x'_3 = \frac{w_{33}}{x_3} = \frac{2.2192}{0.1966} = 11.2879$$

FIG. 5H $$a'_{42} = a'_{24} = a_{24} + x'_3 \cdot v_2 \cdot v_4 = 0.6001 + 11.2879 \cdot (-0.0346) \cdot 0.4377 = 0.4291$$

FIG. 5I $$A_3 = \begin{pmatrix} a'_{11} & a'_{12} & a'_{13} & a'_{14} & a'_{15} \\ a'_{12} & a'_{22} & a'_{23} & 0.4291 & a'_{25} \\ a'_{13} & a'_{23} & a'_{33} & a'_{34} & a'_{35} \\ a'_{14} & 0.4291 & a'_{34} & a'_{44} & a'_{45} \\ a'_{15} & a'_{25} & a'_{35} & a'_{45} & a'_{55} \end{pmatrix}$$

FIG. 5J

EFFICIENT COVARIANCE MATRIX UPDATE

BACKGROUND

Some Global Navigation Satellite Systems (GNSS) applications require an assessment of a position solution utilizing a reduced set of available measurements. Examples of such applications are Advanced Receiver Autonomous Integrity Monitoring (ARAIM) and geometry screening. Integrity of a computed position solution refers to the measure of trust that can be placed in the correctness of information being output from the receiver. Integrity monitoring protects users from position errors arising mainly from weak geometries or satellite faults not yet identified by the system ground monitoring network.

One of the outputs of an ARAIM algorithm is a protection level bounding the integrity. Receivers using the solution separation version of the RAIM algorithm assess a number of possible subsolutions. Each subsolution is determined as a position solution based on a reduced set of satellites. To compute the protection level, the algorithm computes several statistical properties of each subsolution, including the subsolution covariance matrix, which typically requires a matrix inversion operation. Similarly high computational complexity is required to obtain the separation covariance matrix used to determine the thresholds utilized in the fault detection.

Geometry screening is an algorithm selecting the optimal subset of satellites to be used in the position solution. This will become a necessity when several GNSS constellations are operational and there is a large number of satellites in view. Using only a subset of visible satellites can reduce significantly the computational burden and if the subset is chosen properly little or no degradation in accuracy and integrity should be observed. One of the most promising ways of selecting the satellites subset is based on the subsolution covariance matrices.

SUMMARY

In one exemplary embodiment, a GNSS receiver comprises a processor configured to implement an integrity monitoring method. The method comprises accessing an original geometry matrix and an original weighting matrix stored in a memory of the GNSS receiver, for a plurality of satellites arranged in one or more constellations; computing an original covariance matrix corresponding to the original geometry matrix and the original weighting matrix; and generating a first modified geometry matrix corresponding to a modified satellite geometry with a first satellite removed. The method further comprises precomputing a first vector based on the original covariance matrix and a first set of geometry matrix values corresponding to the first satellite in the original geometry matrix; precomputing a first weighting factor based on the first vector, the first set of geometry matrix values, and a first weighting value corresponding to the first satellite in the original weighting matrix; and computing a plurality of elements of a modified covariance matrix based on the original covariance matrix, the first vector, and the first weighting factor.

The GNSS receiver may further comprise an antenna; an RF front-end; a baseband processing module; and a plurality of interfaces. The GNSS receiver may further comprise a hardware abstraction layer; a plurality of drivers; and a real-time operating system. The plurality of satellites may be arranged in at least two constellations. The integrity monitoring method may further comprise iteratively repeating the steps of generating a modified geometry matrix, precomputing a vector, precomputing a weighting factor, and computing a plurality of elements of a modified covariance matrix for a plurality of modified satellite geometries, with additional satellites removed in turn. Computing the plurality of elements of the modified covariance matrix may comprise computing only a subset of values of the modified covariance matrix and then reflecting the computed subset of values to their respective symmetrical counterpart locations in the modified covariance matrix. Computing the plurality of elements of the modified covariance matrix may comprise computing only the diagonal values of an upper left 3×3 submatrix of the modified covariance matrix.

In another exemplary embodiment, a GNSS integrity monitoring method comprises accessing an original geometry matrix and an original weighting matrix stored in a memory of a GNSS receiver, for a plurality of satellites arranged in one or more constellations; computing an original covariance matrix corresponding to the original geometry matrix and the original weighting matrix; and generating a first modified geometry matrix corresponding to a modified satellite geometry with a first satellite removed. The method further comprises precomputing a first vector based on the original covariance matrix and a first set of geometry matrix values corresponding to the first satellite in the original geometry matrix; precomputing a first weighting factor based on the first vector, the first set of geometry matrix values, and a first weighting value corresponding to the first satellite in the original weighting matrix; and computing a plurality of elements of a modified covariance matrix based on the original covariance matrix, the first vector, and the first weighting factor.

The GNSS integrity monitoring method may be conducted in connection with an Advanced Receiver Autonomous Integrity Monitoring (ARAIM) process. The plurality of satellites may be arranged in at least two constellations. The integrity monitoring method may further comprise iteratively repeating the steps of generating a modified geometry matrix, precomputing a vector, precomputing a weighting factor, and computing a plurality of elements of a modified covariance matrix for a plurality of modified satellite geometries, with additional satellites removed in turn. Computing the plurality of elements of the modified covariance matrix may comprise computing only a subset of values of the modified covariance matrix and then reflecting the computed subset of values to their respective symmetrical counterpart locations in the modified covariance matrix. Computing the plurality of elements of the modified covariance matrix may comprises computing only the diagonal values of an upper left 3×3 submatrix of the modified covariance matrix. Precomputing a first vector may comprises precomputing the first vector, $v_i$, using the following equation:

$$v_i = A \cdot g_i = \begin{pmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{pmatrix} \cdot \begin{pmatrix} g_{i1} \\ g_{i2} \\ \vdots \\ g_{in} \end{pmatrix} = \begin{pmatrix} v_1 \\ v_2 \\ \vdots \\ v_n \end{pmatrix},$$

where
G=original geometry matrix;
W=original weighting matrix;
A=original covariance matrix=$(G^T W G)^{-1}$; and
$g_i^T$=i-th row values of G.

In another exemplary embodiment, a GNSS processor comprises a hardware abstraction layer; a plurality of drivers; a real-time operating system; and a GNSS application module configured to implement an integrity monitoring method. The method comprises accessing an original geometry matrix and an original weighting matrix stored in a memory of the GNSS receiver, for a plurality of satellites arranged in one or more constellations; computing an original covariance matrix corresponding to the original geometry matrix and the original weighting matrix; and generating a first modified geometry matrix corresponding to a modified satellite geometry with a first satellite removed. The method further comprises precomputing a first vector based on the original covariance matrix and a first set of geometry matrix values corresponding to the first satellite in the original geometry matrix; precomputing a first weighting factor based on the first vector, the first set of geometry matrix values, and a first weighting value corresponding to the first satellite in the original weighting matrix; and computing a plurality of elements of a modified covariance matrix based on the original covariance matrix, the first vector, and the first weighting factor.

The may be installed in a GNSS receiver. The plurality of satellites may be arranged in at least two constellations. The integrity monitoring method may further comprise iteratively repeating the steps of generating a modified geometry matrix, precomputing a vector, precomputing a weighting factor, and computing a plurality of elements of a modified covariance matrix for a plurality of modified satellite geometries, with additional satellites removed in turn. Computing the plurality of elements of the modified covariance matrix may comprise computing only a subset of values of the modified covariance matrix and then reflecting the computed subset of values to their respective symmetrical counterpart locations in the modified covariance matrix. Computing the plurality of elements of the modified covariance matrix may comprise computing only the diagonal values of an upper left 3×3 submatrix of the modified covariance matrix.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A-2D illustrate various exemplary matrices associated with the GNSS system of FIG. 1.

FIG. 4 illustrates an abridged version of the updated matrix $A_{\bar{i}}$, showing only the elements that need to be computed due to the symmetrical nature of the matrix.

FIGS. 5A-5J illustrate step-by-step results for one specific example of the covariance matrix update method of FIG. 3.

In accordance with common practice, the various described features are not drawn to scale but are drawn to emphasize specific features relevant to the exemplary embodiments.

DETAILED DESCRIPTION

The present application describes a system for implementing an efficient covariance matrix update method, which advantageously reduces the number of computations required to determine subsolution and separation covariance matrices.

Figure 1:
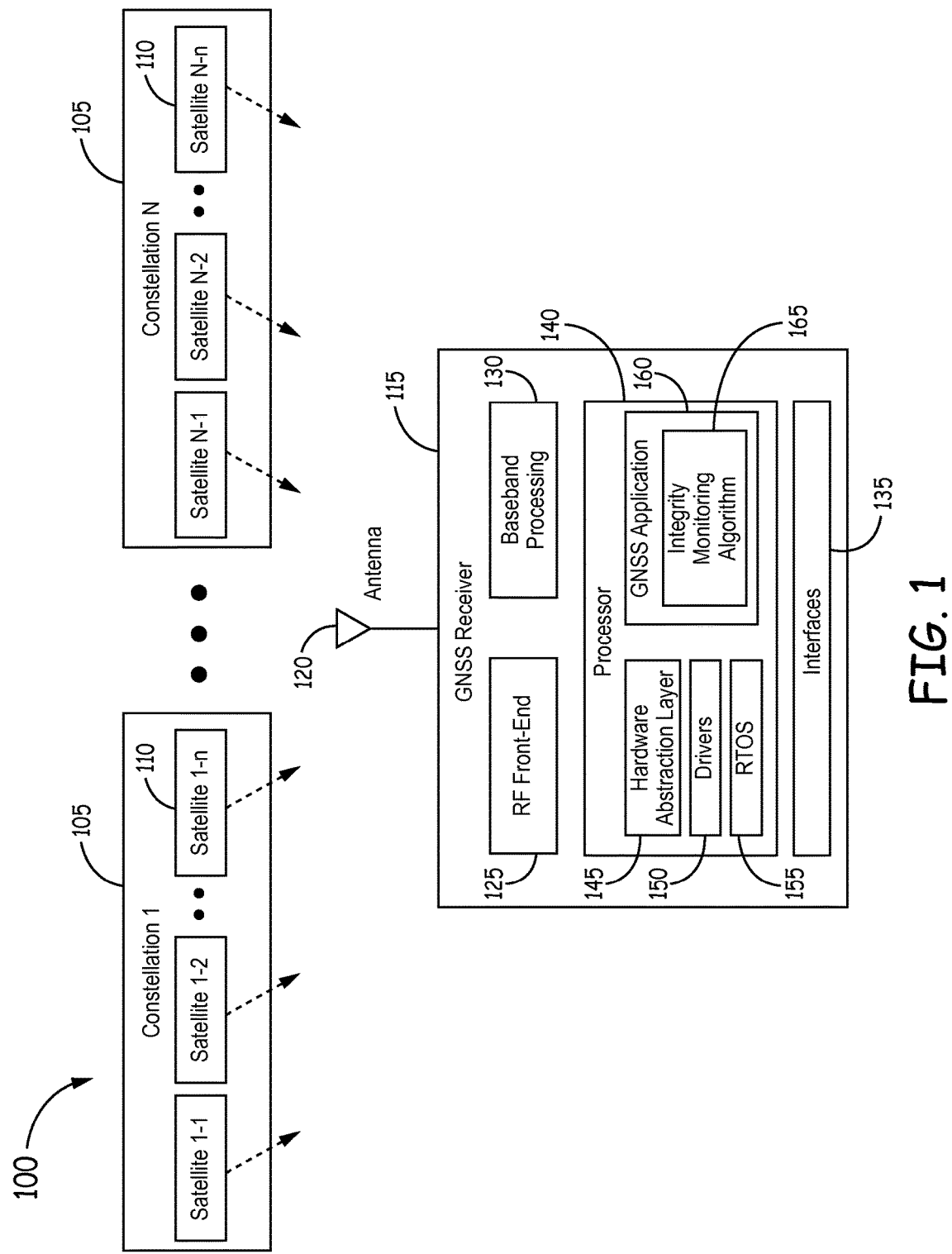
FIG. 1 illustrates a block diagram of an exemplary GNSS system implementing an efficient covariance matrix update method.

FIG. 1 illustrates a block diagram of an exemplary GNSS system 100 implementing an efficient covariance matrix update method. In the illustrated example, the GNSS system 100 comprises a plurality of satellite constellations 105, each comprising a plurality of satellites 110, in communication with a suitable GNSS receiver 115. The GNSS receiver 115 comprises an antenna 120, an RF front-end module 125, a baseband processing module 130, and a plurality of suitable interfaces 135. The GNSS receiver 115 further comprises a processor 140 having a hardware abstraction layer 145, one or more drivers 150, a real-time operating system (RTOS) 155, and a GNSS application module 160 configured to execute an integrity monitoring algorithm 165. In operation, the GNSS system application module 160 can perform covariance matrix calculations with substantially greater efficiency than conventional GNSS systems.

FIGS. 2A and 2B illustrate the geometry matrix G and the weighting matrix W, respectively, of the GNSS system 100. As illustrated in FIG. 2A, geometry matrix G has m rows, which corresponds to the number of satellites 110 in communication with the GNSS receiver 115, and n columns, where n=3+C, with C corresponding to the number of satellite constellations 105 in communication with the GNSS receiver 115. As illustrated in FIG. 2B, weighting matrix W is a square matrix having m rows and columns, with all zero values other than the weighting values along the diagonal. As stated above, m equals the number of satellites 110 in communication with the GNSS receiver 115.

FIG. 2C illustrates the covariance matrix A, which can be computed as $A=(G^TWG)^{-1}$. As shown in FIG. 2C, the covariance matrix A is a square matrix with dimensions of n×n, where n=3+C, with C corresponding to the number of satellite constellations 105 in communication with the GNSS receiver 115. Generally, the covariance matrix A includes three elements of interest, i.e., the diagonal of the upper left 3×3 submatrix, which represent the variances along the three position axes (East, North, Up). The remaining rows and columns represent the variance of time variables in the satellite constellations 105, which are generally unimportant for integrity calculations.

As described above, some GNSS applications such as ARAIM and geometry screening involve multiple covariance matrix computations, each such computation corresponding to a different subsolution with a modified geometry matrix. For example, a given GNSS application may involve computing a modified covariance matrix with i-th satellite removed. In this example, the process of computing the modified covariance matrix begins by defining a modified geometry matrix $G_{\bar{i}}$, as shown in FIG. 2D. Generally, each element of the modified geometry matrix, $g'_{ij}$, is the same as the original geometry matrix, $g_{ij}$, except that the i-th row values are set to zero.

In a conventional GNSS system, the modified covariance matrix $A_{\bar{i}}$ can then be computed using the following formula: $A_{\bar{i}}=(G_{\bar{i}}^TW_{\bar{i}}G_{\bar{i}})^{-1}$. This conventional process requires two matrix multiplications, followed by a calculation of a matrix inverse. The process is then repeated iteratively to compute multiple subsolutions, each with a unique covariance matrix $A_{\bar{i}}$, with additional satellites 110 removed in turn. Such a process is computationally demanding, especially if the GNSS system 100 has a large number of satellites 110.

A number of approaches have been developed over the years in an effort to simplify the process of computing covariance matrices. One such approach is the rank-one update formula, or Sherman-Morrison formula, which is well-known. To provide an example, the rank-one update formula can be implemented by applying the following definitions:

G=satellite geometry matrix;
W=weighting matrix corresponding to G;
$A=(G^TWG)^{-1}$=covariance matrix of the full solution;
$g_i^T$=i-th row values of G ($g_i$ is a n×1 vector);
$G_{\hat{i}}$=G with i-th row set to zeros;
$W_{\hat{i}}$=W with i-th row set to zeros;
$A_{\hat{i}}=(A_{\hat{i}}G_{\hat{i}}^T W_{\hat{i}})^{-1}$=covariance matrix of the subsolution with i-th satellite removed
$S=AG^TW$;
$S_{\hat{i}}=A_{\hat{i}}G_{\hat{i}}^T W_{\hat{i}}$; and
$B_{\hat{i}}=(S_{\hat{i}}-S)W^{-1}(S_{\hat{i}}-S)^T$=separation covariance matrix.

According to the well-known rank-one update formula, the following equation can be used to describe the relationship among the above variables:

$$A_{\hat{i}} = A + \frac{A(g_i w_{ii} g_i^T)A}{1 - g_i^T w_{ii} A g_i} = A + B_{\hat{i}} \quad (1)$$

Equation (1) has the advantage that its computation outputs the covariance matrix of a subsolution with i-th satellite removed, $A_{\hat{i}}$, as well as the fraction, which is in fact the separation covariance matrix of that subsolution, $B_{\hat{i}}$. As a result, Equation (1) describes all statistical properties of a given subsolution. In addition, the rank-one update formula can be repeated iteratively to yield $A_{\hat{I}}$ with satellites whose indices are contained in a set $\hat{I}$ removed.

Generally, as shown in Equation (1), the rank-one update formula involves summing the original matrix with an update matrix divided by a factor. This formula advantageously eliminates the matrix inversion computation step that is typically required in conventional GNSS systems, as described above. In effect, the rank-one update formula trades the conventional matrix inversion computation step for a few additional multiplication steps, which are less computationally demanding.

Despite these advantages, the rank-one update formula exhibits certain undesirable inefficiencies when it is used to compute multiple covariance matrices in GNSS applications. For example, the rank-one update formula becomes imprecise when $\hat{I}$ contains all satellites belonging to a single constellation. The original inversion formula requires removing the all-zero column from the geometry matrix, so that non-singularity is ensured. In the rank-one update formula, the step that removes the last satellite of a given constellation causes problems because the fraction on the right side of Equation (1) becomes imprecise due to hardware arithmetic limitations. In addition, the rank-one update formula fails to take advantage of the fact that the matrix to be updated is always symmetric.

The process described in the present application takes advantage of this symmetry to compute $A_{\hat{I}}$ with substantially greater efficiency than the rank-one update formula and other existing approaches. For example, the process of the present application advantageously involves substantially fewer and simpler arithmetic operations than previous approaches. In addition, unlike the rank-one update formula, the process of the present application can be used to reliably compute the subsolution in which all the satellites of a given constellation are removed.

The process of the present application can be implemented by establishing the following definitions:

$$B = g_i w_{ii} g_i^T \quad (2)$$

$$C = AB \quad (3)$$

$$D = CA \quad (4)$$

Applying these definitions, the numerator of the fraction on the right side of Equation (1) can be simplified as follows:

$$A(g_i w_{ii} g_i^T)A = ABA = CA = D \quad (5)$$

In addition, the following relationships can be expressed:

$$b_{uv} = g_u w_{ii} g_v \quad (6)$$

$$c_{uv} = \sum_{k=1}^{n} a_{uk} b_{kv} = \sum_{k=1}^{n} a_{uk} g_k w_{ii} g_v \quad (7)$$

where $g_u$ is the u-th element of $g_i$. Through appropriate algebraic simplification, $d_{uv}$ can be expressed as follows:

$$\begin{aligned}
d_{uv} &= \sum_{l=1}^{n} c_{ul} a_{lv} \\
&= \sum_{l=1}^{n} \left( \sum_{k=1}^{n} a_{uk} g_k w_{ii} g_l \right) a_{lv} \\
&= w_{ii} \sum_{l=1}^{n} a_{lv} \sum_{k=1}^{n} a_{uk} g_k g_l \\
&= w_{ii} \sum_{l=1}^{n} a_{lv} g_l \sum_{k=1}^{n} a_{uk} g_k \\
&= w_{ii} \underbrace{\left( \sum_{l=1}^{n} a_{lv} g_l \right)}_{S_1} \underbrace{\left( \sum_{k=1}^{n} a_{uk} g_k \right)}_{S_2}
\end{aligned} \quad (8)$$

$S_1$ in Equation (8) can be calculated as the dot product of the v-th column of A and $g_i$, and $S_2$ can be calculated is a dot product of u-th row of A and $g_i^T$. Moreover, since A is symmetric, $a_{lv}=a_{vl}$ and $S_1$ is also the dot product along the v-th row of A and $g_i^T$ and hence $S_1=S_2$. Accordingly, the precomputation of the dot products can advantageously be completed in a single step by computing a vector $v_i$ having dimensions of n×1, as $v_k = \sum\sum_{j=1}^{n} a_{kj} g_j$, 1≤k≤n, or:

$$v_i = A \cdot g_i = \begin{pmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{pmatrix} \cdot \begin{pmatrix} g_{i1} \\ g_{i2} \\ \vdots \\ g_{in} \end{pmatrix} = \begin{pmatrix} v_1 \\ v_2 \\ \vdots \\ v_n \end{pmatrix}, \quad (9)$$

After precomputing such dot product along rows or columns of A, elements of D can advantageously be determined with only two multiplications.

The following definitions can also be established:

$$x_i = 1 - g_i^T w_{ii} A g_i = 1 - g_i^T w_{ii} v_i \quad (10)$$

$$x'_i = w_{ii}/x_i \quad (11)$$

In view of these definitions, $x_i$ corresponds to the denominator of the fraction on the right side of Equation (1). Thus, Equation (1) can be rewritten as follows:

$$A_i^* = A + \frac{w_{ii} v_i v_i^T}{x_i} \quad (12)$$

In addition, Equation (12) can be rewritten as follows:

$$A_i^* = A + x'_i v_i v_i^T \quad (13)$$

The vector $v_i$ of Equation (9) includes all precomputed dot products described above in connection with Equation (8). Thus, individual elements of $A_i^*$ can be computed using the following equation:

$$a'_{rs} = a_{rs} + x'_i v_r v_s \quad (14)$$

Figure 3:
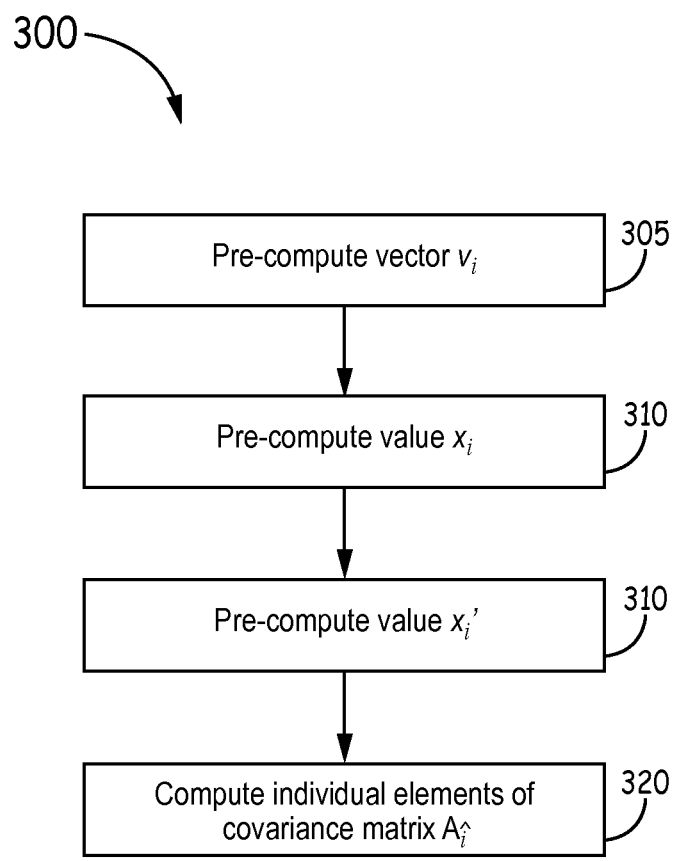
FIG. 3 is a flowchart illustrating the operation of the covariance matrix update method in accordance with the present application.

FIG. 3 is a flowchart illustrating the operation of the covariance matrix update method 300 in accordance with the present application. In a first step 305, the vector $v_i$ is precomputed for a given vector $g_i$, as set forth in Equation (9), above. In a next step 310, the weighting factor $x_i$ is precomputed as set forth in Equation (10), above. In a next step 315, the weighting factor $x'_i$ is precomputed as set forth in Equation (11), above. In a next step 320, individual elements of the updated matrix $A_i^*$ are computed, in turn, as set forth in Equation (14), above.

Advantageously, once the vector $v_i$ and the weighting factor $x'_i$ have been precomputed, each element of the updated matrix, $a'_{rs}$, can be calculated with only two multiplications. Because the updated matrix $A_i^*$ is also symmetric, each element does not need to be computed individually. Rather, the elements $a'_{rs}$ are computed only if $s \geq r$, and the computed elements are then reflected to their respective symmetric counterpart locations in the updated matrix $A_i^*$, which corresponds to the covariance matrix for the subsolution with i-th satellite removed. FIG. 4 illustrates an abridged version of the updated matrix $A_i^*$, showing only the elements that need to be computed due to the symmetrical nature of the matrix. The method 300 can be repeated iteratively for additional subsolutions with more satellites removed, in turn.

Because each element of a given covariance matrix can be computed with only two multiplications, the method 300 of the present application can compute covariance matrices with substantially greater efficiency than the rank-one update formula and other existing approaches. In addition, in the case where the last satellite of a given constellation is removed, the indices r, s that correspond to the time variable of the given constellation can be omitted. Therefore, since constellation removal is the broadest anticipated fault mode, the last step only needs to compute three elements, i.e., the diagonal of the upper left 3×3 submatrix. As a result, the method 300 of the present application does not yield the same imprecise results that occur with the rank-one update formula.

EXAMPLE

FIGS. 5A-5J illustrate step-by-step results for one specific example of the method 300 described above. In this particular example, FIG. 5A illustrates a geometry matrix G populated with values for a specific satellite geometry including 16 satellites from 2 constellations. As shown in FIG. 5A, the geometry matrix G includes 16 rows (1 for each satellite) and 5 columns (3 for x, y, z coordinates and 2 more for the time variables of the 2 constellations).

FIG. 5B illustrates a weighting matrix W populated with values corresponding to the geometry matrix G. As shown in FIG. 5B, the weighting matrix W includes 16 rows and 16 columns, with all zero values except along the diagonal. FIG. 5C illustrates the covariance matrix A corresponding to the full solution. Because the system has 2 constellations, the covariance matrix A is a 5×5 square matrix, although the elements of interest are located in the upper left 3×3 submatrix.

In the example illustrated in FIG. 5, the covariance matrix is computed for the subsolution with the third satellite removed. Accordingly, FIG. 5D illustrates a modified geometry matrix $G_3$, with the third row values set to zero, and FIG. 5E illustrates the vector $g_3$, which includes the values from the third row of the original geometry matrix G.

FIG. 5F illustrates the results of step 305 described above, in which the vector $v_3$ is precomputed for the subsolution with the third satellite removed. FIGS. 5G and 5H illustrate the results of steps 310 and 315 described above, in which the weighting factors $x_3$ and $x'_3$ are precomputed, respectively, for the same subsolution.

FIG. 5I illustrates the results of step 320 described above, in which one specific element $a'_{24}$ of the modified covariance matrix $A_3$ is computed. FIG. 5J illustrates the modified covariance matrix $A_3$, with the computed value placed in the proper matrix locations. In this particular example, the computed value of the element $a'_{24}$ is placed in two matrix locations because the modified covariance matrix $A_3$ is symmetrical, as shown in FIG. 5J. Step 320 can be repeated as needed to compute the remaining elements $a'_{rs}$ and populate the modified covariance matrix $A_3$ with the computed values.

As set forth above, the method described in the present application can compute covariance matrices with substantially greater efficiency than previous approaches. Generally, the computational cost of an algorithm is measured in arithmetic operations: additions A, multiplications M, and divisions D. Although the relative costs of these operations can vary among processors, additions A are generally considered to consume less processor instructions than multiplications M, which are, in turn, considered to use substantially less processor instructions than divisions D. As a general rule, for the purpose of comparing computational costs of various algorithms, A=M and D=2M. Using these "exchange rates," the method described in the present application has been found to exhibit sufficient efficiencies to reduce the computational costs in a typical GNSS application by amounts generally within the range of about 35% to about 41%.

These computational efficiencies advantageously enable designers to implement desired GNSS applications, including ARAIM and geometry screening, using simpler and less expensive processors and other hardware than are required by previous solutions. Therefore, by implementing the systems and methods described in the present application, GNSS systems can be designed at reduced costs without lowering overall system performance.

What is claimed is:

1. A GNSS receiver in communication with one or more satellite constellations, each comprising a plurality of satellites, the GNSS receiver comprising an antenna, an RF front-end, a baseband processing module, a plurality of interfaces, and a processor configured to implement an integrity monitoring method comprising:
    accessing an original geometry matrix and an original weighting matrix stored in a memory of the GNSS receiver, for the plurality of satellites arranged in one or more constellations;

computing an original covariance matrix corresponding to the original geometry matrix and the original weighting matrix;
generating a first modified geometry matrix corresponding to a modified satellite geometry with a first satellite removed;
precomputing a first vector based on the original covariance matrix and a first set of geometry matrix values corresponding to the first satellite in the original geometry matrix;
precomputing a first weighting factor based on the first vector, the first set of geometry matrix values, and a first weighting value corresponding to the first satellite in the original weighting matrix; and
computing a plurality of elements of a modified covariance matrix corresponding to the modified satellite geometry with the first satellite removed, wherein the modified covariance matrix is based on the original covariance matrix, the first vector, and the first weighting factor.

2. The GNSS receiver of claim 1, wherein the processor further comprises:
a hardware abstraction layer;
a plurality of drivers; and
a real-time operating system.

3. The GNSS receiver of claim 1, wherein the plurality of satellites are arranged in at least two constellations.

4. The GNSS receiver of claim 1, wherein the integrity monitoring method further comprises:
iteratively repeating the steps of generating a modified geometry matrix, precomputing a vector, precomputing a weighting factor, and computing a plurality of elements of a modified covariance matrix for a plurality of modified satellite geometries, with additional satellites removed in turn.

5. The GNSS receiver of claim 1, wherein computing the plurality of elements of the modified covariance matrix comprises computing only a subset of values of the modified covariance matrix and then reflecting the computed subset of values to their respective symmetrical counterpart locations in the modified covariance matrix.

6. The GNSS receiver of claim 1, wherein computing the plurality of elements of the modified covariance matrix comprises computing only the diagonal values of an upper left 3×3 submatrix of the modified covariance matrix.

7. A GNSS integrity monitoring method implemented in a GNSS receiver comprising an antenna, an RF front-end, a baseband processing module, a plurality of interfaces, and a processor, the GNSS receiver in communication with one or more satellite constellations, each comprising a plurality of satellites, the GNSS integrity monitoring method comprising:
accessing an original geometry matrix and an original weighting matrix stored in a memory of a GNSS receiver, for the plurality of satellites arranged in one or more constellations;
computing an original covariance matrix corresponding to the original geometry matrix and the original weighting matrix;
generating a first modified geometry matrix corresponding to a modified satellite geometry with a first satellite removed;
precomputing a first vector based on the original covariance matrix and a first set of geometry matrix values corresponding to the first satellite in the original geometry matrix;
precomputing a first weighting factor based on the first vector, the first set of geometry matrix values, and a first weighting value corresponding to the first satellite in the original weighting matrix; and
computing a plurality of elements of a modified covariance matrix corresponding to the modified satellite geometry with the first satellite removed, wherein the modified covariance matrix is based on the original covariance matrix, the first vector, and the first weighting factor.

8. The GNSS integrity monitoring method of claim 7, wherein the GNSS integrity monitoring method is conducted in connection with an Advanced Receiver Autonomous Integrity Monitoring (ARAIM) process.

9. The GNSS integrity monitoring method of claim 7, wherein precomputing a first vector comprises precomputing the first vector, $v_i$, using the following equation:

$$v_i = A \cdot g_i = \begin{pmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{pmatrix} \cdot \begin{pmatrix} g_{i1} \\ g_{i2} \\ \vdots \\ g_{in} \end{pmatrix} = \begin{pmatrix} v_1 \\ v_2 \\ \vdots \\ v_n \end{pmatrix},$$

where
G=original geometry matrix;
W=original weighting matrix;
A=original covariance matrix=$(G^T W G)^{-1}$; and
$g_i^T$=i-th row values of G.

10. The GNSS integrity monitoring method of claim 7, wherein the plurality of satellites are arranged in at least two constellations.

11. The GNSS integrity monitoring method of claim 7, wherein the integrity monitoring method further comprises:
iteratively repeating the steps of generating a modified geometry matrix, precomputing a vector, precomputing a weighting factor, and computing a plurality of elements of a modified covariance matrix for a plurality of modified satellite geometries, with additional satellites removed in turn.

12. The GNSS integrity monitoring method of claim 7, wherein computing the plurality of elements of the modified covariance matrix comprises computing only a subset of values of the modified covariance matrix and then reflecting the computed subset of values to their respective symmetrical counterpart locations in the modified covariance matrix.

13. The GNSS integrity monitoring method of claim 7, wherein computing the plurality of elements of the modified covariance matrix comprises computing only the diagonal values of an upper left 3×3 submatrix of the modified covariance matrix.

14. A GNSS processor in a GNSS receiver comprising an antenna, an RF front-end, a baseband processing module, and a plurality of interfaces, the GNSS receiver in communication with one or more satellite constellations, each comprising a plurality of satellites, the GNSS processor comprising:
a hardware abstraction layer;
a plurality of drivers;
a real-time operating system; and
a non-transitory computer-readable medium embodying a computer program comprising a GNSS application module configured to implement an integrity monitoring method comprising:

accessing an original geometry matrix and an original weighting matrix stored in a memory of the GNSS receiver, for the plurality of satellites arranged in one or more constellations;

computing an original covariance matrix corresponding to the original geometry matrix and the original weighting matrix;

generating a first modified geometry matrix corresponding to a modified satellite geometry with a first satellite removed;

precomputing a first vector based on the original covariance matrix and a first set of geometry matrix values corresponding to the first satellite in the original geometry matrix;

precomputing a first weighting factor based on the first vector, the first set of geometry matrix values, and a first weighting value corresponding to the first satellite in the original weighting matrix; and computing a plurality of elements of a modified covariance matrix corresponding to the modified satellite geometry with the first satellite removed, wherein the modified covariance matrix is based on the original covariance matrix, the first vector, and the first weighting factor.

15. The GNSS processor of claim 14, wherein the plurality of satellites are arranged in at least two constellations.

16. The GNSS processor of claim 14, wherein the integrity monitoring method further comprises:

iteratively repeating the steps of generating a modified geometry matrix, precomputing a vector, precomputing a weighting factor, and computing a plurality of elements of a modified covariance matrix for a plurality of modified satellite geometries, with additional satellites removed in turn.

17. The GNSS processor of claim 14, wherein computing the plurality of elements of the modified covariance matrix comprises computing only a subset of values of the modified covariance matrix and then reflecting the computed subset of values to their respective symmetrical counterpart locations in the modified covariance matrix.

18. The GNSS processor of claim 14, wherein computing the plurality of elements of the modified covariance matrix comprises computing only the diagonal values of an upper left 3×3 submatrix of the modified covariance matrix.

\* \* \* \* \*